(12) United States Patent
Nagasaki

(10) Patent No.: US 10,104,245 B2
(45) Date of Patent: Oct. 16, 2018

(54) SERVER APPARATUS, IMAGE FORMING SYSTEM, AND NON-TRANSITORY COMPUTER-READABLE STORAGE MEDIUM

(71) Applicant: Shinya Nagasaki, Kanagawa (JP)

(72) Inventor: Shinya Nagasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/440,689

(22) Filed: Feb. 23, 2017

(65) Prior Publication Data

US 2017/0257496 A1 Sep. 7, 2017

(30) Foreign Application Priority Data

Mar. 4, 2016 (JP) ................................. 2016-042247
Feb. 20, 2017 (JP) ................................. 2017-029488

(51) Int. Cl.
 *H04N 1/00* (2006.01)
 *G06F 3/12* (2006.01)

(52) U.S. Cl.
 CPC ....... *H04N 1/00244* (2013.01); *G06F 3/1205* (2013.01); *G06F 3/1286* (2013.01); *H04N 1/00411* (2013.01); *H04N 2201/0094* (2013.01)

(58) Field of Classification Search
 USPC ...................................................... 358/1.15
 See application file for complete search history.

(56) References Cited

U.S. PATENT DOCUMENTS

| | | | | |
|---|---|---|---|---|
| 2004/0190057 | A1* | 9/2004 | Takahashi | G06F 3/1205 358/1.15 |
| 2005/0128968 | A1* | 6/2005 | Yang | H04W 48/16 370/312 |
| 2014/0313539 | A1* | 10/2014 | Kawano | G06F 21/44 358/1.14 |
| 2015/0077799 | A1* | 3/2015 | Arai | H04N 1/442 358/1.15 |

FOREIGN PATENT DOCUMENTS

| | | |
|---|---|---|
| JP | 2015-084514 | 4/2015 |
| JP | 2015-170107 | 9/2015 |

\* cited by examiner

*Primary Examiner* — Ngon Nguyen
(74) *Attorney, Agent, or Firm* — Harness, Dickey & Pierce, P.L.C.

(57) ABSTRACT

A server apparatus includes a memory to store internal information of each of a plurality of image forming apparatuses and a job received from a first information terminal in association with identification information of the first information terminal, and circuitry to receive, from one image forming apparatus, identification information of a second information terminal that is brought close to the one image forming apparatus, determine whether the identification information of the first information terminal and the second information terminal match with each other, based on a determination that the identification information of the first information terminal matches the identification information of the second information terminal, select an image forming apparatus that is to execute the job from among the plurality of image forming apparatuses that belong to a same group to which the one image forming apparatus belongs, and instruct the selected image forming apparatus to execute the job.

12 Claims, 14 Drawing Sheets

| USER ID | TERMINAL 1 | TERMINAL 2 | TERMINAL 3 |
|---|---|---|---|
| uID_AAAA | sID_AAAA | tID_AAAA | |
| uID_BBBB | sID_BBBB | pID_AAAA | |
| uID_CCCC | sID_CCCC | sID_DDDD | tID_BBBB |
| ⋮ | ⋮ | ⋮ | ⋮ |

FIG. 6A

| FIG. 6 | FIG. 6A |
|---|---|
| | FIG. 6B |

| GROUP | IMAGE FORMING APPARATUS No. | POSITION INFORMATION | INTERNAL STATE | CURRENT DETERMINATION |
|---|---|---|---|---|
| 1st FLOOR OFFICE | 01 | LONGITUDE 35.△△○○·· LATITUDE 139.○○×□·· | PRESENCE OR ABSENCE OF TONER AMOUNT (CYAN) | PRESENT |
| | | | PRESENCE OR ABSENCE OF TONER AMOUNT (YELLOW) | PRESENT |
| | | | PRESENCE OR ABSENCE OF TONER AMOUNT (MAGENTA) | PRESENT |
| | | | PRESENCE OR ABSENCE OF TONER AMOUNT (BLACK) | PRESENT |
| | | | REMAINING NUMBER OF SHEETS OF PAPER | HIGH |
| | | | REMAINING AMOUNT OF STAPLES | HIGH |
| | | | ·· | ·· |
| | | | ·· | ·· |
| | | | ·· | ·· |
| | 02 | LONGITUDE 35.△△△△·· LATITUDE 139.○○×○·· | PRESENCE OR ABSENCE OF TONER AMOUNT (CYAN) | PRESENT |
| | | | PRESENCE OR ABSENCE OF TONER AMOUNT (YELLOW) | PRESENT |
| | | | PRESENCE OR ABSENCE OF TONER AMOUNT (MAGENTA) | PRESENT |
| | | | PRESENCE OR ABSENCE OF TONER AMOUNT (BLACK) | PRESENT |
| | | | REMAINING NUMBER OF SHEETS OF PAPER | LOW |
| | | | REMAINING AMOUNT OF STAPLES | MIDDLE |
| | | | ·· | ·· |

FIG. 6B

| | 03 | LONGITUDE 35.△△○×·· LATITUDE 139.○○×××·· | | | | PRESENCE OR ABSENCE OF TONER AMOUNT (CYAN) | PRESENCE OR ABSENCE OF TONER AMOUNT (YELLOW) | PRESENCE OR ABSENCE OF TONER AMOUNT (MAGENTA) | PRESENCE OR ABSENCE OF TONER AMOUNT (BLACK) | REMAINING NUMBER OF SHEETS OF PAPER | REMAINING AMOUNT OF STAPLES | ... | ... | ... | ... |
|---|---|---|---|---|---|---|---|---|---|---|---|---|---|---|---|
| | | | ... | ... | ... | ABSENT | ABSENT | ABSENT | ABSENT | EMPTY | LOW | ... | ... | ... | ... |

| RECEIVED SIGNAL STRENGTH (dBm) | PRESET AREA | ID INFORMATION TRANSMISSION FLAG |
|---|---|---|
| 0 dBm | | |
| Y dBm | | ON |
| ⋮ | AREA A | |
| Z dBm | | ON |
| ⋮ | AREA B | |
| ⋮ | ⋮ | ⋮ |

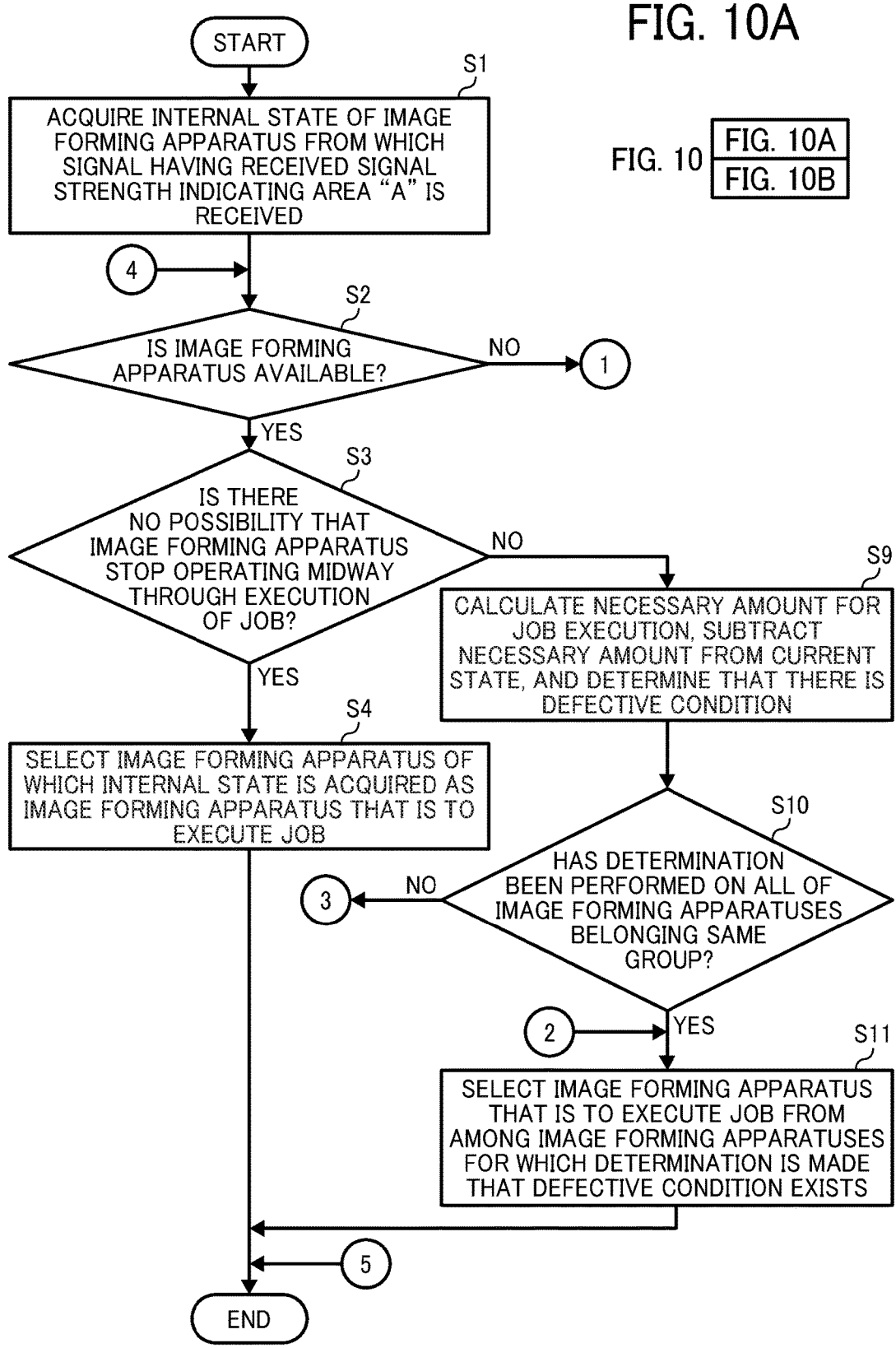

FIG. 11

| IMAGE FORMING APPARATUS No. | POSSIBILITY OF ABNORMAL STATE |
|---|---|
| 01 | ABNORMAL |
| 02 | LOW |
| 03 | HIGH |
| ⋮ | ⋮ |

FIG. 12A

| TERMINAL ID | JOB ID |
|---|---|
| sID_AAAA | Job_aaa |
| sID_BBBB | Job_bbb |
| ⋮ | ⋮ |

FIG. 12B

```
<HEADER>
  JOB ID: Job_aaa
  COLOR MODE: COLOR
  NUMBER OF PAGES: 20 PAGES
  NUMBER OF COPIES: 10 COPIES
  STAPLE: ON
        ⋮
<BODY>
      (PRINT DATA)
```

| GROUP | IMAGE FORMING APPARATUS No. | INTERNAL STATE | CURRENT DETERMINATION |
|---|---|---|---|
| 1st FLOOR OFFICE | 01 | PRESENCE OR ABSENCE OF TONER AMOUNT (CYAN) | PRESENT |
| | | PRESENCE OR ABSENCE OF TONER AMOUNT (YELLOW) | PRESENT |
| | | PRESENCE OR ABSENCE OF TONER AMOUNT (MAGENTA) | PRESENT |
| | | PRESENCE OR ABSENCE OF TONER AMOUNT (BLACK) | PRESENT |
| | | REMAINING NUMBER OF SHEETS OF PAPER | HIGH |
| | | REMAINING AMOUNT OF STAPLES | HIGH |
| | | ... | ... |
| | 02 | PRESENCE OR ABSENCE OF TONER AMOUNT (CYAN) | PRESENT |
| | | PRESENCE OR ABSENCE OF TONER AMOUNT (YELLOW) | PRESENT |
| | | PRESENCE OR ABSENCE OF TONER AMOUNT (MAGENTA) | PRESENT |
| | | PRESENCE OR ABSENCE OF TONER AMOUNT (BLACK) | PRESENT |
| | | REMAINING NUMBER OF SHEETS OF PAPER | LOW |
| | | REMAINING AMOUNT OF STAPLES | MIDDLE |
| | | ... | ... |

FIG. 14B

| | | | | | | | | | | | | | |
|---|---|---|---|---|---|---|---|---|---|---|---|---|---|
| | . | . | . | . | PRESENCE OR ABSENCE OF TONER AMOUNT (CYAN) | PRESENCE OR ABSENCE OF TONER AMOUNT (YELLOW) | PRESENCE OR ABSENCE OF TONER AMOUNT (MAGENTA) | PRESENCE OR ABSENCE OF TONER AMOUNT (BLACK) | REMAINING NUMBER OF SHEETS OF PAPER | REMAINING AMOUNT OF STAPLES | . | . | . |
| | . | . | . | . | ABSENT | ABSENT | ABSENT | ABSENT | EMPTY | LOW | . | . | . |
| 03 | | | | | | | | | | | | | |

SERVER APPARATUS, IMAGE FORMING SYSTEM, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2016-042247, filed on Mar. 4, 2016 and 2017-029488, filed on Feb. 20, 2017 in the Japan Patent Office, the entire disclosures of which are hereby incorporated by reference herein.

BACKGROUND

Technical Field

The present disclosure relates to a server apparatus, an image forming system, and a non-transitory computer-readable storage medium.

Description of the Related Art

In recent years, an image forming system using so-called cloud computing has been proposed enabling an information terminal to send information for job execution not directly to an image forming apparatus but to a server as a relay device.

In such system using cloud computing, for information used in job execution is stored on a network, for example. Accordingly, a user can instruct the job execution from any desired terminal.

SUMMARY

A server apparatus communicably connected to a plurality of image forming apparatuses includes a memory and circuitry. The memory is configured to store internal information of each of the plurality of image forming apparatuses which are categorized into one or more groups, and a job including image output, received from a first information terminal, in association with identification information of the first information terminal. The circuitry is configured to receive, from one image forming apparatus from among the plurality of image forming apparatuses, identification information of a second information terminal that is brought close to the one image forming apparatus. The circuitry is further configured to determine whether the identification information of the first information terminal matches the identification information of the second information terminal. The circuitry is further configured to, based on a determination that the identification information of the first information terminal matches the identification information of the second information terminal, select an image forming apparatus that is to execute the job stored in the memory in association with the identification information of the first information terminal from among the plurality of image forming apparatuses that belong to a same group to which the one image forming apparatus belongs. The circuitry is further configured to instruct the selected image forming apparatus to execute the job. In the selecting of the image forming apparatus that is to execute the job, the circuitry determines, based on the internal information of the one image forming apparatus, whether the one image forming apparatus is available for execution of the job stored in the memory in association with the identification information of the first information terminal. In the selecting of the image forming apparatus that is to execute the job, the circuitry further, based on a determination that the one image forming apparatus is available, determines whether there is a possibility that the one image forming apparatus stops operating halfway through the job. In the selecting of the image forming apparatus that is to execute the job, the circuitry further, based on a determination that there is no possibility that the one image forming apparatus stops operating halfway through the job, selects the one image forming apparatus as the image forming apparatus that is instructed to execute the job.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 6A and 6B are a view illustrating an example configuration of an internal state database according to an embodiment of the present invention;

FIGS. 10A and 10B is a flowchart illustrating an operation, performed by the server apparatus, of selecting an image forming apparatus that is to execute a job including image output according to an embodiment of the present invention;

FIG. 11 is an example of a table indicating a determination result for each of the image forming apparatuses belonging to a same group according to an embodiment of the present invention;

FIGS. 12A and 12B are an example configuration of the job including image output according to an embodiment of the present invention;

FIGS. 14A and 14B are a view illustrating another example configuration of the internal state database according to an embodiment of the present invention.

Figure 1:
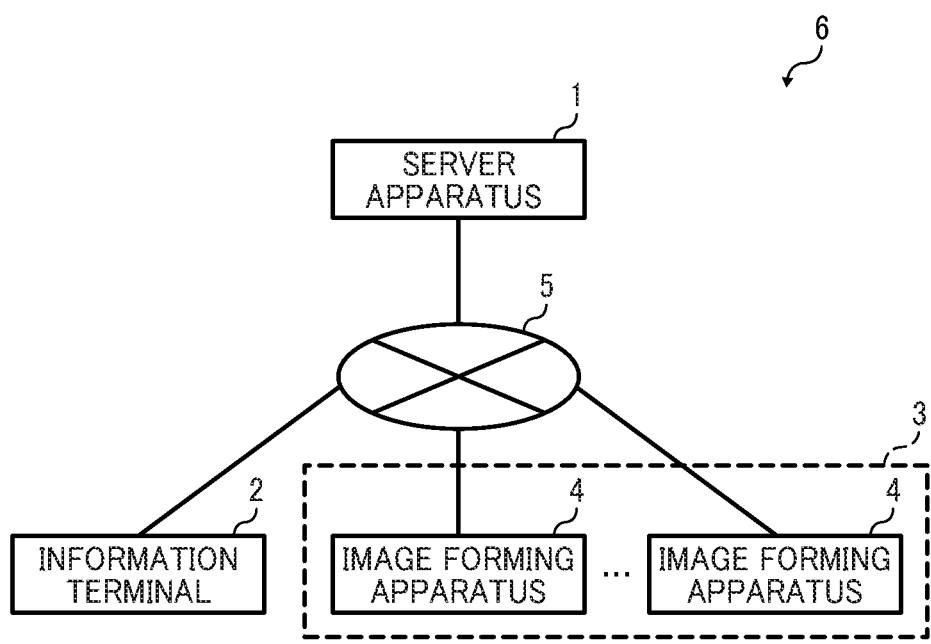
FIG. 1 is a schematic diagram illustrating an example configuration of an image forming system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

First, a description is given of a hardware configuration of an image forming system 6 according to an embodiment of the present invention. FIG. 1 is a schematic diagram illustrating an example configuration of the image forming system 6 according to the present embodiment. As illustrated in FIG. 1, the image forming system 6 according to the present embodiment includes a server apparatus 1, an information terminal 2, and an image forming apparatus group 3, which are connected to one another via a network 5. The image forming apparatus group 3 includes a plurality of image forming apparatuses 4. The server apparatus 1, the information terminal 2, and the image forming apparatus group 3 are connected to one another using so-called cloud network. In other words, the server apparatus 1 stores data generated at the information terminal 2 and the image forming apparatus group 3 or information used by each device. Users are able to access or share the data or the information stored in the server apparatus 1.

The image forming apparatus group 3 does not receive an instruction for job execution directly from the information terminal 2. In other words, a user instruction for job execution to the image forming apparatus group 3 is once transmitted to the server apparatus 1. The server apparatus 1 transmits the user instruction for job execution received from the information terminal 2 to the image forming apparatus group 3.

Figure 2:
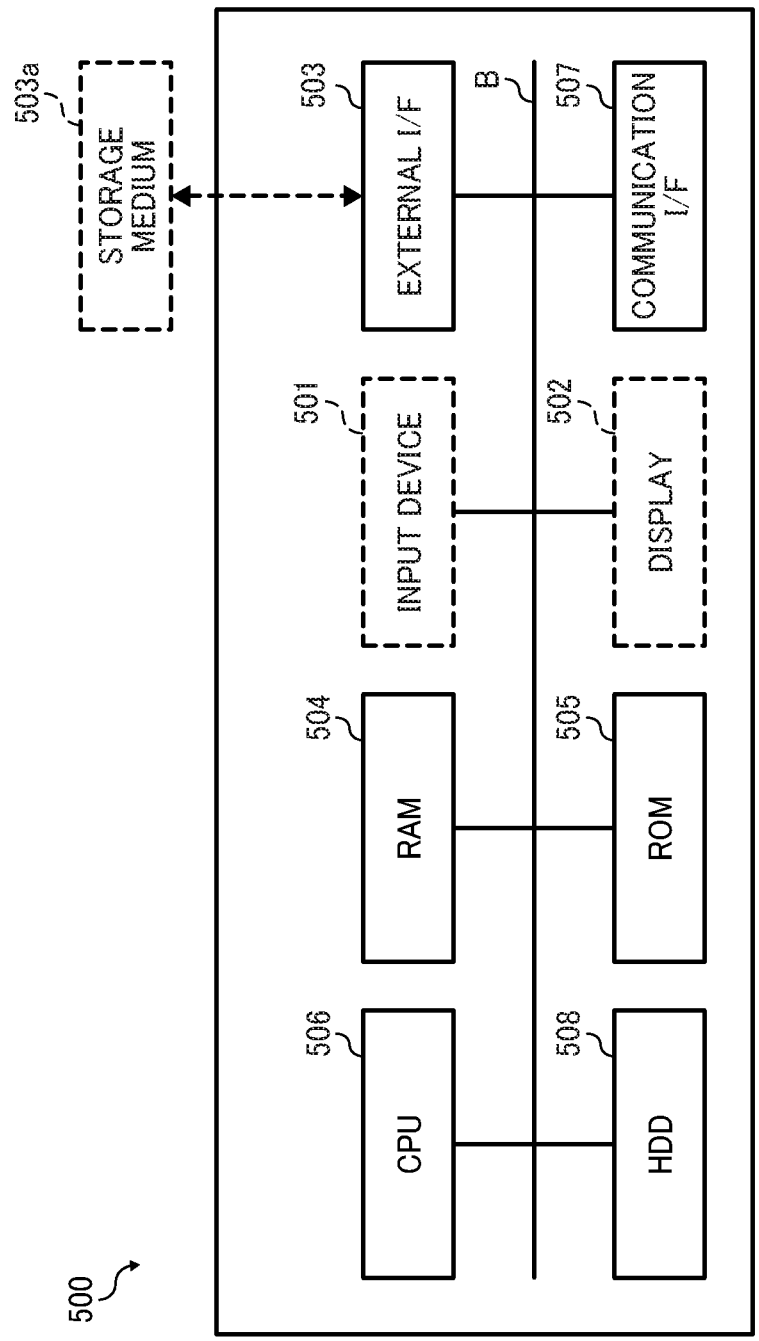
FIG. 2 is a block diagram illustrating an example hardware configuration of a computer according to an embodiment of the present invention.
Figure 3:
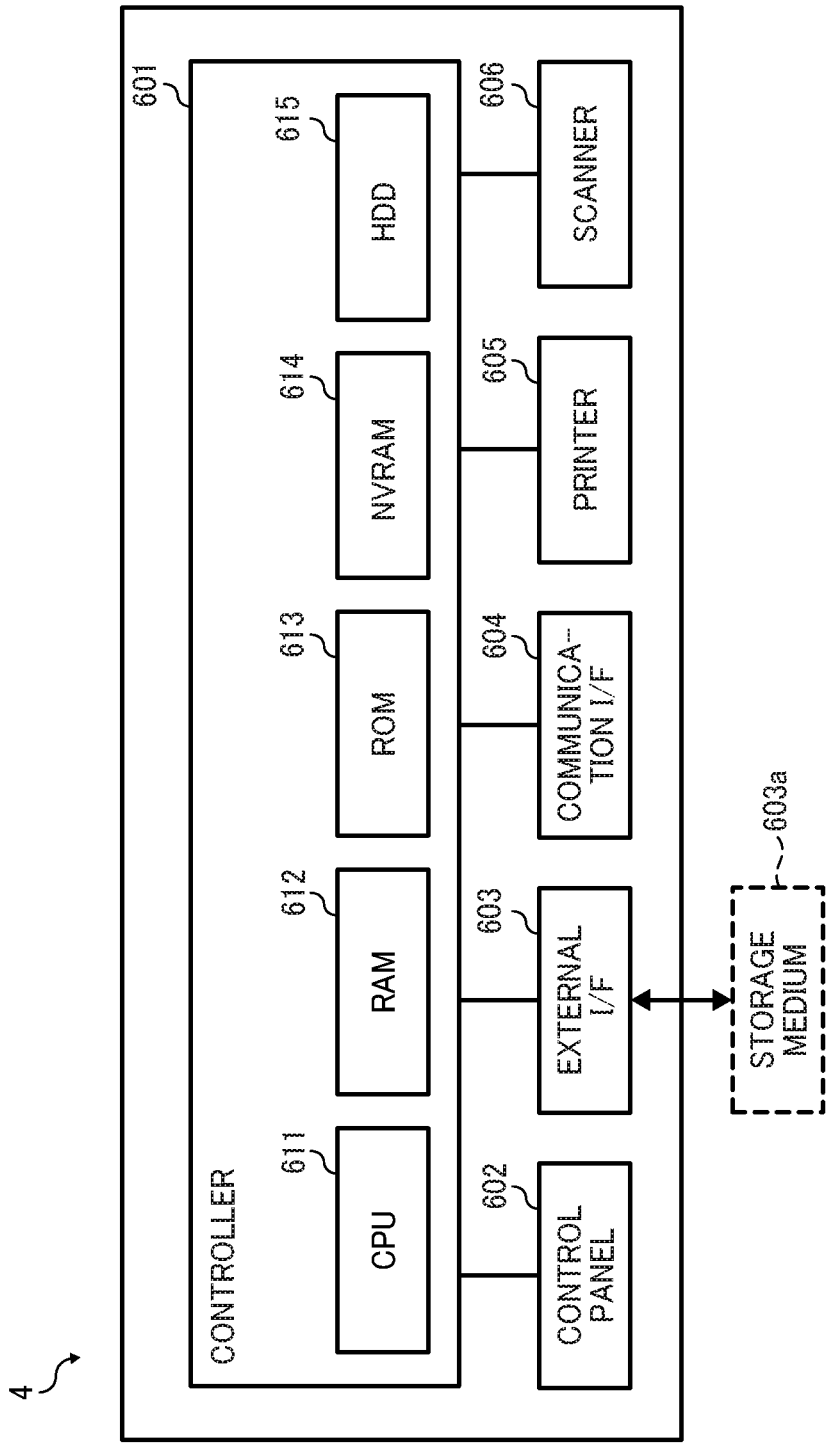
FIG. 3 is a block diagram illustrating an example hardware configuration of the image forming apparatus according to according to an embodiment of the present invention.

A detailed description is given of hardware configurations of server apparatus 1 and the information terminal 2, with reference to FIG. 2. In addition, a detailed description is given of a hardware configuration of the image forming apparatus 4, with reference to FIG. 3. FIG. 2 is a block diagram illustrating an example hardware configuration of a computer 500 according to the present embodiment. FIG. 3 is a block diagram illustrating an example hardware configuration of the image forming apparatus 4 according to the present embodiment. It should be noted that each image forming apparatus 4 constituting the image forming apparatus group 3 has the similar or substantially the similar configuration.

First, the server apparatus 1 is implemented by the computer 500 illustrated in FIG. 2. The server apparatus 1 includes a central processing unit (CPU) 506, a communication interface (I/F) 507, and a hard disc drive (HDD) 508. The CPU 506 controls entire operation of the server apparatus 1. The communication interface 507 exchanges various types of information with an external device or an electronic device such as a computer. The HDD 508 keeps storing various type of data even after a power of the server apparatus 1 is turned off.

The server apparatus 1 further includes an input device 501, a display device 502, an external interface 503, a random access memory (RAM) 504, and a read only memory (ROM) 505. The input device 501 includes a keyboard, a mouse, and/or a touch panel enabling a user to input various operation instruction to the server apparatus 1. The display device includes a display that displays a processing result, etc.

The ROM 505 stores a specific program or programs in advance. The RAM 504 temporarily stores the program read out from the ROM 505. The CPU 506 controls entire operation of the server apparatus 1 according to the specific program.

The communication interface 507 of the server apparatus 1 is an interface that exchanges various types of information with an external device or an electronic device such as a computer. Examples of the communication interface 507 include a USB port, a LAN port, and a wireless LAN port, through which a cloud network between the server apparatus 1 and other devices is implemented.

The communication interface 507 may further include a communication device medium that enables a near-distance wireless communication network such as Bluetooth (registered trademark). Examples of the near-distance wireless communication network include an infrared communication network. However, the infrared communication network is just an example, and alternatively any other suitable communication network may be used, provided that it enables a near-distance wireless communication network. In this embodiment, the communication interface 507 is implemented by, for example, a wireless infrared communication interface. However, this is just an example, and any other suitable interface may be used, provided that it enables the server apparatus 1 to exchange data with an external device.

The external interface 503 is an interface for communicating with an external device as a recording medium 503a. The external interface 503 enables the server apparatus 1 to read or write data from or to the recording medium 503a. Examples of the recording medium 503a include a flexible disc, a CD, a DVD, a SD memory card, and a USB memory.

Further, the information terminal 2 is implemented by the computer 500 illustrated in FIG. 2. The server apparatus 1 further includes the input device 501, the display device 502, the external interface 503, the RAM 504, and the ROM 505. The CPU 506 executes a specific program to control entire operation of the information terminal 2. The ROM 505 stores a program read out by the CPU 506 when the information terminal 2 is turned on. The RAM 504 is used as a work area for the CPU 506. The HDD 508 keeps storing various type of data even after a power of the information terminal 2 is turned off. The input device 501 is implemented by input keys, a touch panel, etc. The display device 502 includes a display having a liquid crystal panel or an organic electro luminescence (EL) panel, for example.

The information terminal 2 further includes a global positioning system (GPS) module as another dedicated function. It should be noted that the dedicated function operates in accordance with instructions from the CPU 301 in cooperation.

In the GPS module of the information terminal 2, a receiver receives signals from satellites in the earth's atmosphere and analyzes the signals to determine a current position and a time. Specifically, the current position is indicated by the longitude and latitude around the earth's axis calculated based on the signals received from satellites.

The current position is calculated mainly using the triangulation based on the signals received from three satellites. Signals received from four satellites are used for calculating the time in addition to the current position. The calculation of these time and positions are known, and therefore the detailed description thereof is omitted.

The communication interface 507 of the information terminal 2 is an interface that exchanges various types of information with an external device or an electronic device such as a computer. Examples of the communication interface 507 include a USB port, a LAN port, and a wireless LAN port, through which a cloud network between the information terminal 2 and other devices is implemented.

The communication interface 507 may further include a communication device medium that enables a near-distance wireless communication network such as Bluetooth. In this embodiment, the information terminal 2 and the image forming apparatus group 3 exchange a specific signal and information with each other, and the near-distance wireless communication network may be used in such data exchange. A description is given later of a near-distance wireless communication between the information terminal 2 and the image forming apparatus group 3. Examples of the near-distance wireless communication network include an infrared communication network. However, the infrared communication network is just an example, and alternatively any other suitable communication network may be used, provided that it enables a near-distance wireless communication network. In this embodiment, the communication interface 507 is implemented by, for example, a wireless infrared communication interface. However, this is just an example, and any other suitable interface may be used, provided that it enables the information terminal 2 to exchange data with an external device.

The external interface 503 is an interface for communicating with an external device as a recording medium 503a. The external interface 503 enables the information terminal 2 to read or write data from or to the recording medium 503a. Examples of the recording medium 503a include a flexible disc, a CD, a DVD, a SD memory card, and a USB memory.

Hereinafter, a description is given of a hardware configuration of the image forming apparatus 4 with reference to FIG. 3. It should be noted that a description is given of one arbitrary image forming apparatus 4 from among the image forming apparatus group 3. As described above, each image forming apparatus 4 constituting the image forming apparatus group 3 has the similar or substantially the similar configuration.

The image forming apparatus 4 has a hardware configuration as illustrated in FIG. 3. The image forming apparatus 4 includes a controller 601, a control panel 62, an external interface 603, a communication interface 604, a printer 605, and a scanner 606. The controller 601 includes a CPU 611, a RAM 612, a ROM 613, a non-volatile random access memory (NVRAM) 614, and a HDD 615.

The CPU 611 executes a specific program to control entire operation of the image forming apparatus 4. The ROM 613 stores a program read out by the CPU 611 when the image forming apparatus 4 is turned on. The RAM 612 is used as a work area for the CPU 611. The NVRAM 614 stores setting information, for example. The HDD 615 keeps storing various type of data even after a power of the image forming apparatus 4 is turned off.

The control panel 602 includes an input unit that receives a user input, and a display unit that displays various information. The input unit of the control panel 602 is implemented by input keys, a touch panel, etc. The display unit of the control panel 602 includes a display having a liquid crystal panel or an organic electro luminescence (EL) panel, for example. The external interface 603 is an interface for communicating with an external device such as a recording medium 603a. The external interface 603 enables the image forming apparatus 4 to read or write data from or to the recording medium 603a. Examples of the recording medium 603a include a flexible disc, a CD, a DVD, a SD memory card, and a USB memory.

The printer 605 is a printing apparatus that forms an image on a transferred medium in accordance with print data. Examples of the transferred medium include paper, coated paper, thick paper, overhead projector (OHP) transparencies, pre-preg, and copper foil. The scanner 606 is a reading device that scans a document to obtain image data (electronic data).

The communication interface 604 of the image forming apparatus 4 is an interface that exchanges various types of information with an external device or electronic device such as a computer. Examples of the communication interface 604 include a USB port, a LAN port, and a wireless LAN port, through which a cloud network between the image forming apparatus 4 and other devices is implemented.

The communication interface 604 may further include a communication device medium that enables a near-distance wireless communication network such as Bluetooth. In this embodiment, the image forming apparatus 4 exchanges a specific signal and information with the information terminal 2, and the near-distance wireless communication network may be used in such data exchange. A description is given later of a near-distance wireless communication between the information terminal 2 and the image forming apparatus 4. Examples of the near-distance wireless communication network include an infrared communication network. However, the infrared communication network is just an example, and alternatively any other suitable communication network may be used, provided that it enables a near-distance wireless communication network. In this embodiment, the communication interface 507 is implemented by, for example, a wireless infrared communication interface. However, this is just an example, and any other suitable interface may be used, provided that it enables the image forming apparatus 4 to exchange data with an external device.

Figures 4, 5:
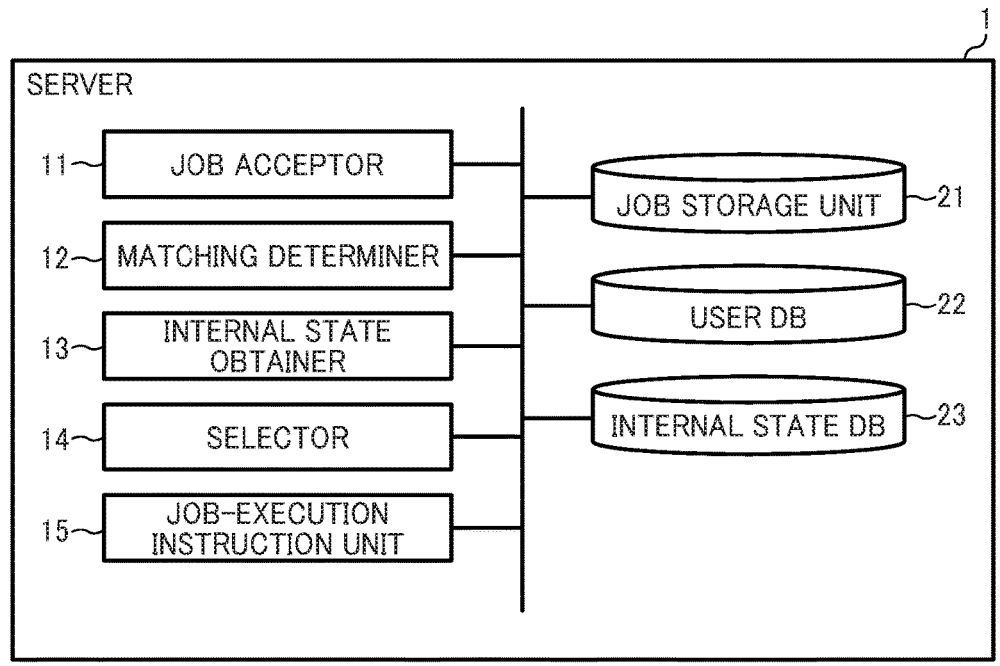
FIG. 4 is a block diagram illustrating a functional configuration of a server apparatus according to an embodiment of the present invention.
FIG. 5 is a view illustrating an example configuration of a user database that associates a user with an information terminal that the user owns according to an embodiment of the present invention.

FIG. 4 is a block diagram illustrating a functional configuration of the server apparatus 1 according to the present embodiment. As illustrated in FIG. 4, the server apparatus 1 includes a job acceptor 11, a matching determiner 12, an internal state obtainer 13, a selector 14, a job-execution instruction unit 15, a job storage unit 21, a user database (DB) 22, and an internal state database 23.

The user database 22 of the server apparatus 1 associates at least one information terminal 2 that communicates with the server apparatus 1 via the network 5 with a user who owns the information terminal 2. For example, when the information terminal 2 sends a job to the image forming apparatus group 3 in accordance with a user instruction, the server apparatus 1 has to recognize from which user and information terminal 2 a job and information are sent.

FIG. 5 is a view illustrating an example configuration of the user database 22 that associates a user with the information terminal 2 that the user owns. The number of information terminals 2 associated with a user is not limited to one. Two or more information terminals 2 may be associated with a user. Further, in the user database 22 of FIG. 5, various types of information terminal 2 may be associated with a user, such as a personal computer, a smartphone, and a tablet.

In the user database 22 of FIG. 5, a user identifier (ID) that identifies a user is indicated by uID#AAAA, uID#BBBB, etc. Further, in the user database 22 of FIG. 5, a terminal ID that identifies a smartphone as the information terminal 2 is indicated by sID#AAAA, for example. The terminal ID of a personal computer as the information terminal 2 is indicated by pID#AAAA, for example. In addition, the terminal ID of a tablet as the information terminal 2 is indicated by tID#AAAA, for example. These IDs as indicated in FIG. 5 are just examples, and any suitable characters or letters may be used as the user ID and the terminal ID. Because the user and the information terminal 2 that the user owns are associated with each other as described above, it is possible to identify the user who instructs transmission of a job or information.

The job acceptor 11 of the server apparatus 1 accepts a job including image output from the information terminal 2. The job acceptor 11 further stores the job received from the information terminal 2 in the job storage unit 21. The job storage unit 21 stores instruction for executing the job including image output and image data or information used for the job execution, which are transmitted to the image forming apparatus group 3 from the information terminal 2, in association with each information terminal 2 that transmits the instruction.

The matching determiner 12 determines whether the information terminal 2 that transmits the job matches the information terminal 2 that is brought close to the image forming apparatus group 3 by using the terminal ID. A detailed description is given later of the determination by the matching determiner 12. The internal state obtainer 13 acquires, from the image forming apparatus 4, information indicating the internal state of the image forming apparatus 4. The information indicating the internal state of the image forming apparatus 4 may be referred to as "internal information" hereinafter. The internal state obtainer 13 further stores the acquired internal information in the internal state database 23. The internal state database 23 stores the internal information related to a job including image output acquired from the image forming apparatus 4 as illustrated in FIGS. 6A and 6B.

FIGS. 6A and 6B are a view illustrating an example configuration of the internal state database 23. The internal state database 23 includes items of a group, an image forming apparatus No., a position information, an internal state, and a current determination. The item "group" is information indicating a group to which a plurality of image forming apparatuses 4 that reside in a specific area belong. For example, in the internal state database 23 of FIGS. 6A and 6B, "Office on 1st floor" is defined as a group. The item "image forming apparatus No." is set with the number of the image forming apparatus 4 that belongs to the group. The number of the image forming apparatus 4 may be an apparatus ID of the image forming apparatus 4. Two or more groups may be set. For example, the plurality of image forming apparatuses 4 may be categorized into a plurality of groups according to a level, such as "office on the 2nd floor" and "office on the 3rd floor" in addition to the "office on the 1st floor".

The item "position information" is set with position information of the image forming apparatus 4. The item "internal state" is set with types of the internal information acquired from the image forming apparatus 4. The types of the internal information include information indicating the remaining amount of toner, information indicating the remaining number of sheets of paper, and information indicating the remaining amount of staples. In a broad sense, the internal information is interpreted as all types of information relating to a job including image output. The item "current determination" indicates a current status for each of the types of the internal information.

For example, in the internal state database 23 of FIGS. 6A and 6B, "PRESENT" or "ABSENT" is set as the current determination as to the remaining amount of toner. The "PRESENT" indicates that there is toner remaining in the image forming apparatus 4. By contrast, the "ABSENT" indicates that there is no toner remaining in the image forming apparatus 4. Further, for example, in the internal state database 23 of FIGS. 6A and 6B, "High", "Middle" or "Low" is set as the current determination as to the remaining number of sheets of paper. The "High" indicates that there are a large number of sheets of paper remaining in the image forming apparatus 4. The "Middle" indicates that there are an intermediate number of sheets of paper remaining in the image forming apparatus 4. The "Empty" indicates that there is no sheet of paper remaining in the image forming apparatus 4. It should be noted that the internal state database 23 of FIGS. 6A and 6B is just an example.

Further, the selector 14 of the server apparatus 1 selects the image forming apparatus 4 that is to execute a job based on the internal information of the image forming apparatus 4 stored in the internal state database 23. The job-execution instruction unit 15 instructs the image forming apparatus 4 selected by the selector 14 to execute a job.

Figures 7, 8:
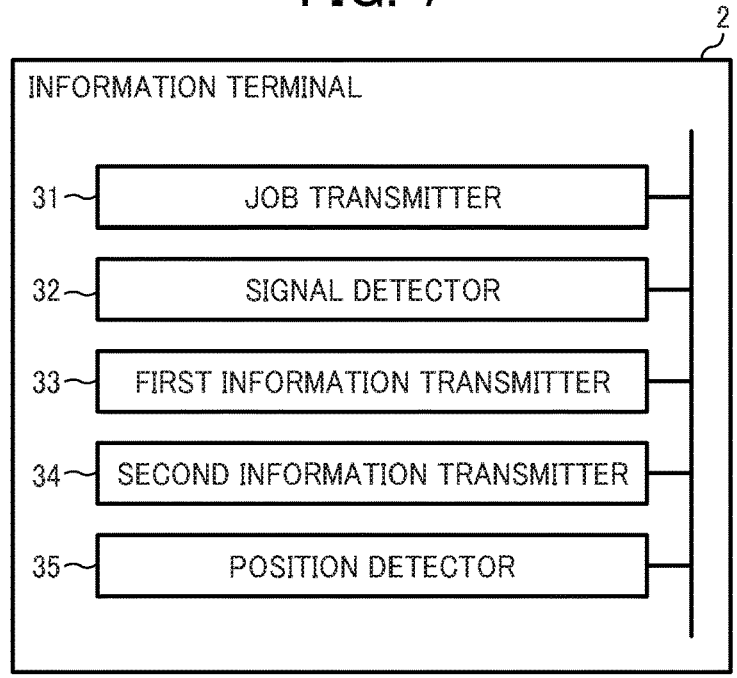
FIG. 7 is a block diagram illustrating a functional configuration of the information terminal according to an embodiment of the present invention.
FIG. 8 is an example of a preset area table according to an embodiment of the present invention.

FIG. 4 is a block diagram illustrating a functional configuration of the information terminal 2 according to the present embodiment. As illustrated in FIG. 7, the information terminal 2 includes a job transmitter 31, a signal detector 32, a first information transmitter 33, a second information transmitter 34, and a position detector 35. The job transmitter 31 transmits a job including image output to the server apparatus 1.

The signal detector 32 of the information terminal 2 detects a signal output from the image forming apparatus 4. A received signal strength of the signal output from the image forming apparatus 4 varies depending on a position of the information terminal 2 that receives the signal. The information terminal 2 may include a specific application such that the information terminal 2 receives the signal transmitted from the image forming apparatus 4. The received signal strength is calculated according to a specific application program. The strength of received signal is indicated by a dBm value.

The first information transmitter 33 or the second information transmitter 34 performs predetermined processing based on the received signal strength of the signal detected by the signal detector 32 of the information terminal 2. The first information transmitter 33 and the second information transmitter 34 stores in advance a preset area table as illustrated in FIG. 8. FIG. 8 is an example of the preset area table.

Hereinafter, a description is given of the preset area table of FIG. 8. As described above, the received signal strength (dBm) varies depending on a distance between the image forming apparatus 4 and the information terminal 2. A plurality of preset areas are determined in advance depending on a range of the received signal strength.

In FIG. 8, a first range of received signal strength (Y dBm≤x<Z dBm, in the present embodiment) is associated with Area A. Further, a second range of received signal strength (Z dBm≤x, in the present embodiment) is associated with Area B. Further, an "ID information transmission flag" in the preset area table of FIG. 8 is a flag defining whether the information terminal 2 transmits its own identifier to the image forming apparatus 4 when the information terminal 2 receives a signal indicating a received signal strength corresponding to each boundary of the areas (Y dBm in the Area A, and Z dBm in the Area B). This identifier of the information terminal 2 is the terminal ID of the information terminal 2, for example. Such terminal ID is set in advance. Specifically, the first information transmitter 33 transmits the identifier of the information terminal 2 as first information in response to receiving a signal indicating a received signal strength (Y dBm) corresponding to a boundary between the Area A and a farther area. Further, the second information transmitter 34 transmits the identifier of the information terminal 2 as second information in response to receiving a signal indicating a received signal strength (Z dBm) corresponding to a boundary between the Area A and the Area B.

As described heretofore, the information terminal 2 and the image forming apparatus 4 exchange information based on a received signal strength of the signal of which received signal strength varies depending on a position where the signal is received. The server apparatus 1 receives the terminal ID of the information terminal 2 when the information terminal 2 is brought close to the image forming apparatus 4. This enables the server apparatus 1 to determine whether the information terminal 2 that instructs the job execution matches the information terminal 2 that is brought close to the image forming apparatus 4. The position detector 35 acquires position information of the information terminal 2 using a GPS module.

Figure 9:
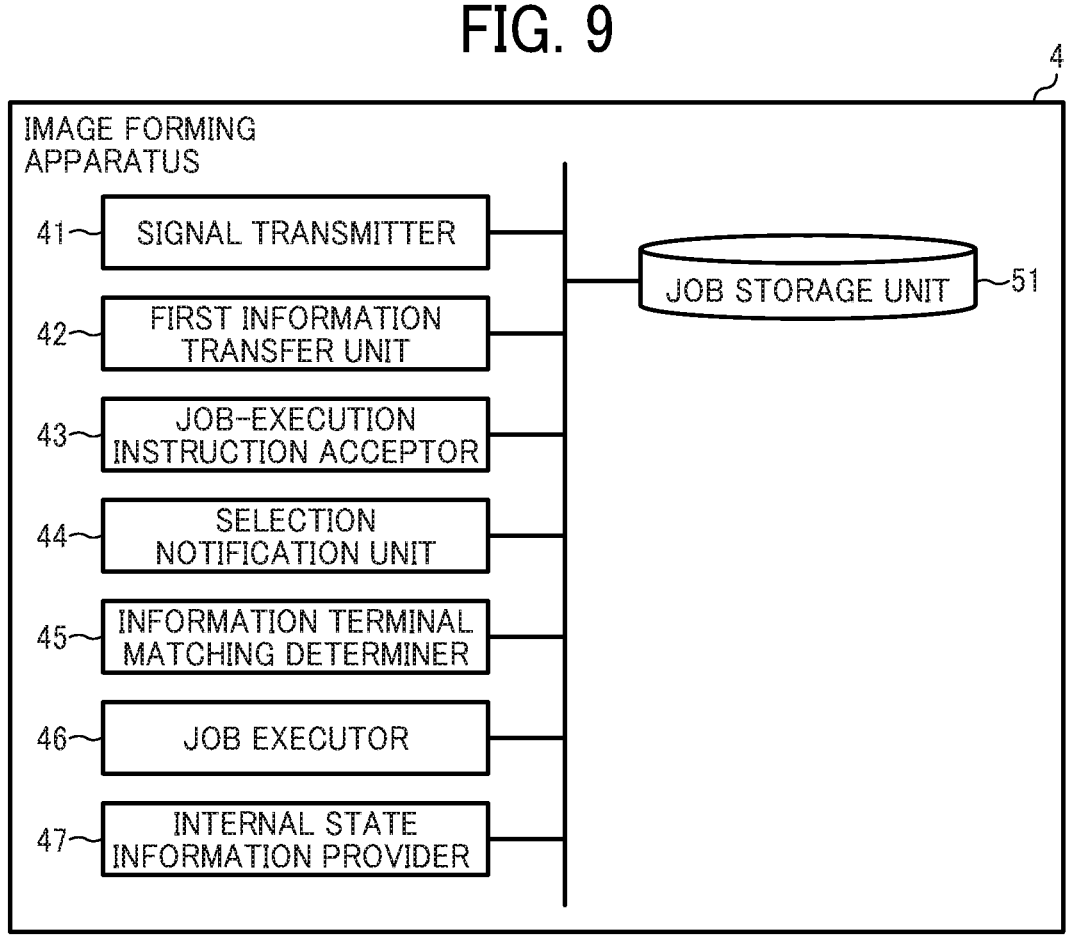
FIG. 9 is a block diagram illustrating a functional configuration of the image forming apparatus according to an embodiment of the present invention.

FIG. 9 is a block diagram illustrating a functional configuration of the image forming apparatus 4 according to the present embodiment. As illustrated in FIG. 9, the image forming apparatus 4 includes a signal transmitter 41, a first information transfer unit 42, a job-execution instruction acceptor 43, a selection notification unit 44, an information terminal matching determiner 45, a job executor 46, and an internal state information provider 47. The signal transmitter 41 generates a signal based on an advertising packet such as iBeacon and Bluetooth low energy (BLE), for example. The information terminal 2 detects the signal according to a specific application program. The received signal strength of the signal varies depending on a distance between a transmitter (the image forming apparatus 4) and a receiver (the information terminal 2 in this disclosure). The signal transmitter 41 continuously outputs the generated signal at a predetermined interval. Accordingly, the shorter the distance between the image forming apparatus 4 as a transmitter and the information terminal 2 as a receiver, the stronger the received signal strength.

The first information transfer unit 42 receives the first information transmitted from the first information transmitter 33 of the information terminal 2, and transfers the received first information to the server apparatus 1. The job-execution instruction acceptor 43 accepts the job execution from the server apparatus 1, when the server apparatus 1 determines that the information terminal 2 that has transmitted the first information to the server apparatus 1 matches the information terminal 2 that has transmitted the job to the server apparatus 1. The job-execution instruction acceptor 43 stores the accepted job in a job storage unit 51.

The selection notification unit 44 notifies outside that the image forming apparatus 4 is an image forming apparatus that is to execute the job. For example, the selection notification unit 44 implements the notification to the outside by causing a light emitting element such as a light emitting diode (LED) to emit light. The light emitting element may emit various colors of light to express various contents of notification. Further, the light emitting element may emit light at various time intervals to express various contents of notification. Further, the selection notification unit 44 may implement the notification to the outside by sound. The sound used for the notification may be a user's voice recorded in advance or sound that is preset by a program.

Thus, the image forming apparatus 4 that is to execute the job notifies outside that it is going to execute a job. Accordingly, the image forming system 6 according to the present embodiment is able to attract (guide) a user who has instructed the job execution toward the image forming apparatus 4 that is to execute the job.

The information terminal matching determiner 45 determines whether the information terminal 2 that has transmitted the first information matches the information terminal 2 that has transmitted the second information. When the information terminal matching determiner 45 determines that the information terminal 2 that has transmitted the first information matches the information terminal 2 that has transmitted the second information, the job executor 46 executes the job that is transmitted from the information terminal 2 that has transmitted the first information and the second information and is stored in the job storage unit 51.

The internal state information provider 47 of the image forming apparatus 4 collects the internal information that is information indicating a current internal state of the image forming apparatus 4 and stores the collected information. This internal information includes information indicating the amount of toner remaining in the image forming apparatus 4, information indicating the number of sheets of paper remaining in a sheet tray, and information indicating the remaining amount of staples. In a broad sense, the internal information is interpreted as all types of information relating to a job including image output. These types of internal information may be collected using one or more detecting sensors placed at a specific position(s).

The internal state information provider 47 periodically collects all types of information relating a job including image output to transmit the internal information to the server apparatus 1. The server apparatus 1 stores the received internal information in the internal state database 23 illustrated in FIGS. 6A and 6B in a specific format.

First, the server apparatus 1 manages a plurality of image forming apparatus 4, which are divided into a plurality of groups depending on an area where each image forming apparatus 4 is placed. The groups are associated with different areas such as floors or levels in a typical office. However, such grouping is just an example, and any other suitable grouping is possible. In this embodiment, a description is given of a case in which three image forming apparatuses 4 belong to a group of "Office on the 1st floor" as an area.

As described above, in the internal state database 23, all types of information relating to the job including image output are managed, such as information indicating a remaining amount of toner and information indicating the number of sheets of paper remaining in a sheet tray. In the internal state database 23, the current determination as to the internal state is updated based on the information that is periodically transmitted from the image forming apparatus 4. This current determination may be determination as to whether there is toner or a sheet of paper or determination as to the remaining amount of sheets of paper or the remaining amount of staples.

In response to receiving, from the information terminal 2, an instruction for executing a job including image output, the selector 14 of the server apparatus 1 determines which image forming apparatus 4 is to execute the job from among the plurality of image forming apparatuses 4. The selector 14 selects the image forming apparatus 4 based on the internal information received from each image forming apparatus 4.

The selection of the image forming apparatus 4 by the selector 14 is triggered by a detection result by the signal detector 32 of the information terminal 2. Hereinafter, a description is given on the assumption that a user carrying the information terminal 2 comes close to the image forming apparatus group 3, after the information terminal 2 gives an instruction for executing a job including image output to the server apparatus 1.

The signal detector 32 of the information terminal 2 detects a signal output from the signal transmitter 41 of the image forming apparatus 4. A received signal strength of the signal output from the image forming apparatus 4 varies depending on a position of the information terminal 2 that receives the signal. When the received signal strength of the signal detected by the information terminal 2 indicates that the information terminal 2 is brought to the Area A, the information terminal 2 sends information indicating that the information terminal 2 is brought close to the Area A to the image forming apparatus 4. Further, the information terminal 2 sends its own terminal identification information to the image forming apparatus 4 together with the information indicating that the information terminal 2 is brought close to the Area A. This enables the image forming apparatus 4 to be notified of which information terminal 2 is brought to the Area A.

In response to receiving, from the information terminal 2, the information indicating that the information terminal 2 is brought close to the Area A and its identification information, the image forming apparatus 4 transfers the received information and terminal identification information to the server apparatus 1. In response to receiving these items of information from the image forming apparatus 4, the server apparatus 1 starts an operation for selecting the image forming apparatus 4 that is to execute the job including image output that has been received in advance from the information terminal 2.

Figure 10B:
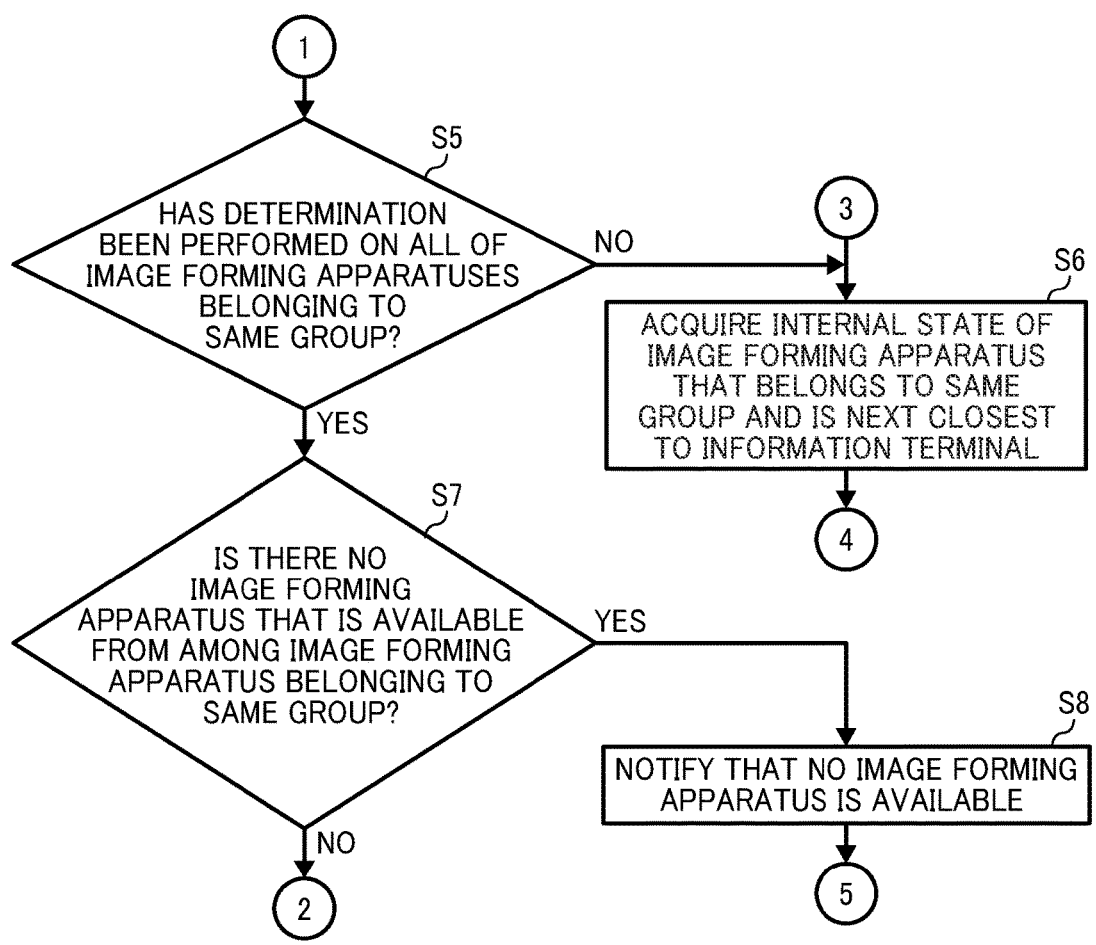

FIGS. 10A and 10B is a flowchart illustrating steps in an operation, performed by the server apparatus 1, of selecting the image forming apparatus 4 that is to execute a job including image output. First, when the information terminal 2 is brought close to the image forming apparatus group 3, the selector 14 of the server apparatus 1 acquires the internal information of the image forming apparatus 4 which has transmitted the information indicating that the information terminal 2 is brought to the Area A and the terminal identification information (S1). This image forming apparatus 4 is an image forming apparatus, from among the plurality of image forming apparatuses 4, that first transmits, to the server apparatus 1, the information indicating that the information terminal 2 is brought to the Area A and the terminal identification information. In other words, this image forming apparatus 4 is an image forming apparatus that is closest to the information terminal 2 from among the plurality of image forming apparatuses 4. The selector 14 acquires the internal information of the image forming apparatus 4 that is closest to the information terminal 2 from the internal state database 23 to determine whether the image forming apparatus 4 is currently available (S2).

For example, the selector 14 determines that the image forming apparatus 4 is currently unavailable when a cover of the image forming apparatus 4 is opened, there is no toner, there is no developer, a photoconductor is not usable, a paper jam is occurring, the image forming apparatus 4 is stopped to operate, and a transmission record is in a full state.

When the selector 14 determines that the image forming apparatus 4 is currently available (S2: YES), the selector 14 determines whether there is no possibility that the image forming apparatus 4 will stop operating halfway through the job (S3). More specifically, the selector 14 calculates the amount of toner, the number of sheets of paper, etc., that are required to finish the job, and subtracts the calculated result from the current internal state for simulation. When the selector 14 determines that there is no possibility that the image forming apparatus 4 will stop operating halfway through the job based on the simulation (S3: YES), the selector 14 selects the image forming apparatus 4 that is closest to the information terminal 2 as the image forming apparatus 4 that is to execute the job (S4).

When the selector 14 determines that the image forming apparatus 4 that is closest to the information terminal 2 is currently unavailable (S2: NO), the selector 14 determines whether the determination is performed on all image forming apparatuses 4 belonging to the same group (S5). When there is one or more image forming apparatuses 4 belonging to the same group for which the determination has not been performed yet (S5: NO), the selector 14 acquires the internal information of the image forming apparatus 4 that is next closest to the information terminal 2 (S6). Then, the operation returns to S2.

When the selector 14 determines that there is a possibility that the image forming apparatus 4 will stop operating halfway through the job (S3: NO), the selector 14 turns on an availability flag with a condition that abnormality determination is present (S9). In other words, the selector 14 turns on the availability flag with the condition that abnormality determination is present, when there is a possibility that the image forming apparatus 4 stops operating halfway through the job but the selector 14 cannot determine whether the operation stop is inevitable. In addition, the server apparatus 1 turns on the availability flag when the image forming apparatus 4 is not currently usable because it is currently executing another job.

When turning on the availability flag with the condition that abnormality determination is present, the selector 14 may associate a level of "possibility of abnormal state" with each image forming apparatus 4 as illustrated in FIG. 11 according to the degree of severity of the abnormality to select the image forming apparatus 4 whose abnormality is relatively less serious. FIG. 11 is an example of a table indicating a determination result for each of the image forming apparatuses 4 belonging to the same group. In the example table of FIG. 11, "Abnormal", "Low" or "High" as a level possibility of becoming in an abnormal state is associated with each image forming apparatus 4 belonging to the same group.

The "Abnormal" indicates that the image forming apparatus 4 is unavailable. The "Low" indicates that although there is a possibility that the image forming apparatus 4 will stop operating halfway through the job, this possibility is low. The "High" indicates that there is a high possibility that the image forming apparatus 4 will stop operating halfway through the job. It should be noted that the availability flag is turned on with the condition that abnormality determination is present as described above when the "possibility of abnormal state" is "Low" or "High" in FIG. 11, for example.

Hereinafter, a description is given of an example operation at S3 of determining whether there is a possibility that the image forming apparatus 4 will stop operating halfway through the job. For example, it is assumed that "High" in the current determination as to the remaining number of sheets of paper in FIGS. 6A and 6B indicates that the remaining number of sheets of paper is 400 or more. Further, it is assumed that "Middle" indicates that the remaining number of sheets of paper is 100 to 399. Furthermore, it is assumed that "Low" indicates that the remaining number of sheets of paper is 1 to 99. Still further, it is assumed that "Empty" indicates that the remaining number of sheets of paper is zero.

In addition, it is assumed that a job as illustrated in FIGS. 12A and 12B is to be executed. FIGS. 12A and 12B are an example configuration of the job including image output. A table of FIG. 12A associates the terminal ID of the information terminal 2 that has transmitted a job with a job ID that identifies a job. FIG. 12B is an illustration for describing information of a job identified by the job ID. As illustrated in FIG. 12, the information of the job includes a header part and a body part. The head part contains the job ID of the job as well as information for specifying a color mode, the number of pages, the number of copies, and a staple setting. The body part is print data necessary for image output.

The selector 14 determines whether there is a possibility that the image forming apparatus 4 will stop operating halfway through a job based on the number of sheets of paper required for job execution and the current determination as to the remaining number of sheet of paper stored in the internal state database 23. In an example of FIG. 12B, the number of sheets of paper required for job execution is 200. With respect to the image forming apparatus 4 that is associated with the image forming apparatus No. 01 in the internal state database 23, the remaining number of sheets of paper is 400 or more because the current determination is "High". Accordingly, the selector 14 determines that this image forming apparatus 4 will not stop operating halfway through the job. With respect to the image forming apparatus 4 that is associated with the image forming apparatus No. 02 in the internal state database 23, the remaining number of sheets of paper is 1 to 99 because the current determination is "Low". Accordingly, the selector 14 determines that there is high possibility that this image forming apparatus 4 will not stop operating halfway through the job. With respect to the image forming apparatus 4 that is associated with the image forming apparatus No. 03 in the internal state database 23, the remaining number of sheets of paper is zero because the current determination is "Empty". Accordingly, the selector 14 determines that this image forming apparatus 4 is unavailable.

Referring again to FIGS. 10A and 10B, the selector 14 determines whether the determination is performed on all image forming apparatuses 4 belonging to the same group (S10). When there is one or more image forming apparatuses 4 belonging to the same group for which the determination has not been performed yet (S10: NO), the selector 14 acquires the internal information of the image forming apparatus 4 that is next closest to the information terminal 2 (S6). Then, the operation returns to S2.

When the determination has been performed for all of the image forming apparatuses 4 belonging to the same group (S10: YES), the selector 14 selects one image forming apparatus 4 that is to execute the job from the image forming apparatuses 4 for which the availability flag is turned on with the condition that abnormal determination is present (S11). At S11, in order to decrease the possibility that the image forming apparatus 4 stop operating halfway through a job, the selector 14 may select the image forming apparatus 4 whose abnormality is relatively less serious based on the level of the abnormality determination that is set as described above.

By contrast, when the determination has been already performed for all of the image forming apparatuses 4 belonging to the same group (S5: YES), the selector 14 determines whether there is no image forming apparatuses 4 for which the availability flag is turned on with the condition that abnormal determination is present from among the image forming apparatuses 4 belonging to the same group (S7). When there is one or more image forming apparatuses 4 for which the availability flag is turned on (S7: NO), the selector 14 selects one image forming apparatus 4 that is to execute the job from the image forming apparatuses 4 for which the availability flag is turned on with the condition that abnormal determination is present (S11). When there is no image forming apparatuses 4 for which the availability flag is turned on (S7: YES), the selector 14 causes the image forming apparatus 4 that is closest to the information terminal 2 to notify a user that all image forming apparatuses 4 are unavailable (S8).

When the selector 14 of the server apparatus 1 selects the image forming apparatus 4 that is to execute a job, the job-execution instruction unit 15 of the server apparatus 1 transmits, to the selected image forming apparatus 4, the image data and other information for implementing the execution of the job received from the information terminal 2. Further, together with the image data and the other information, the job-execution instruction unit 15 transmits, to the selected image forming apparatus 4, information of the terminal ID of the information terminal 2 from which the instruction for job execution is received.

The selection notification unit 44 of the image forming apparatus 4 notifies a specific content to the outside by sound via a microphone and an audio input/output interface. For example, the selection notification unit 44 notifies the specific content indicating that the image forming apparatus 4 is an image forming apparatus that is to execute a job based on the selection by the selector 14 of the server apparatus 1. Otherwise, the selection notification unit 44 notifies the specific content indicating that there is no available image forming apparatus 4 from among the image forming apparatuses 4 belonging to the same group of a specific area. The selection notification unit 44 notifies these contents to the outside by sound.

The sound for notification may be a user's voice recorded in advance or sound that is preset by a program. Thus, the image forming apparatus 4 that is selected as an image forming apparatus that is to execute the job notifies that it is going to execute a job. Accordingly, the image forming system 6 according to the present embodiment is able to attract (guide) a user who has instructed the job execution toward the selected image forming apparatus 4.

Further, the selection notification unit 44 of the image forming apparatus 4 notifies a specific content to the outside by light emission from a light emitting element such as a full-color LED. For example, the selection notification unit 44 notifies the specific content indicating that the image forming apparatus 4 is an image forming apparatus that is to execute a job based on the selection by the selector 14 of the server apparatus 1. Otherwise, the selection notification unit 44 notifies the specific content indicating that there is no available image forming apparatus 4 from among the image forming apparatuses 4 belonging to the same group of a specific area. The selection notification unit 44 notifies these contents to the outside by light emission.

When the image forming apparatus 4 that is to execute the job is selected, the user carrying the information terminal 2 with him/her comes closer to the image forming apparatus 4 that outputs sound or emits light for the notification. Hereinafter, a description is given an operation performed after the image forming apparatus 4 that is to execute the job is selected.

A description is given on the assumption that the information terminal 2 is brought closer to the image forming apparatus 4 than the Area A as defined in the preset area table of FIG. 8. When the information terminal 2 is brought closer to the image forming apparatus 4, the information terminal 2 receives a signal indicating a received signal strength of Z dBm, which is greater than Y dBm. In response to receiving the signal indicating a received signal strength of Z dBm, the information terminal 2 transmits its own identifier to the image forming apparatus 4 in the same or substantially same manner as when the information terminal 2 receives the signal having a received signal strength of Y dBm. This identifier of the information terminal 2 is the terminal ID of the information terminal 2, for example. Such terminal ID is set in advance.

As described above, when the image forming apparatus 4 is selected as an image forming apparatus that is to execute a job, the image forming apparatus 4 receives, from the server apparatus 1, the terminal ID (first information) of the information terminal 2 that has instructed the job execution. When the information terminal 2 is brought to the Area B, the image forming apparatus 4 receives the terminal ID (the second information) from the information terminal 2. The image forming apparatus 4 determines whether the information terminal 2 from which the first information is received matches the information terminal 2 from which the second information is received. When the two terminals match with each other, the image forming apparatus 4 executes a job.

Figure 13:
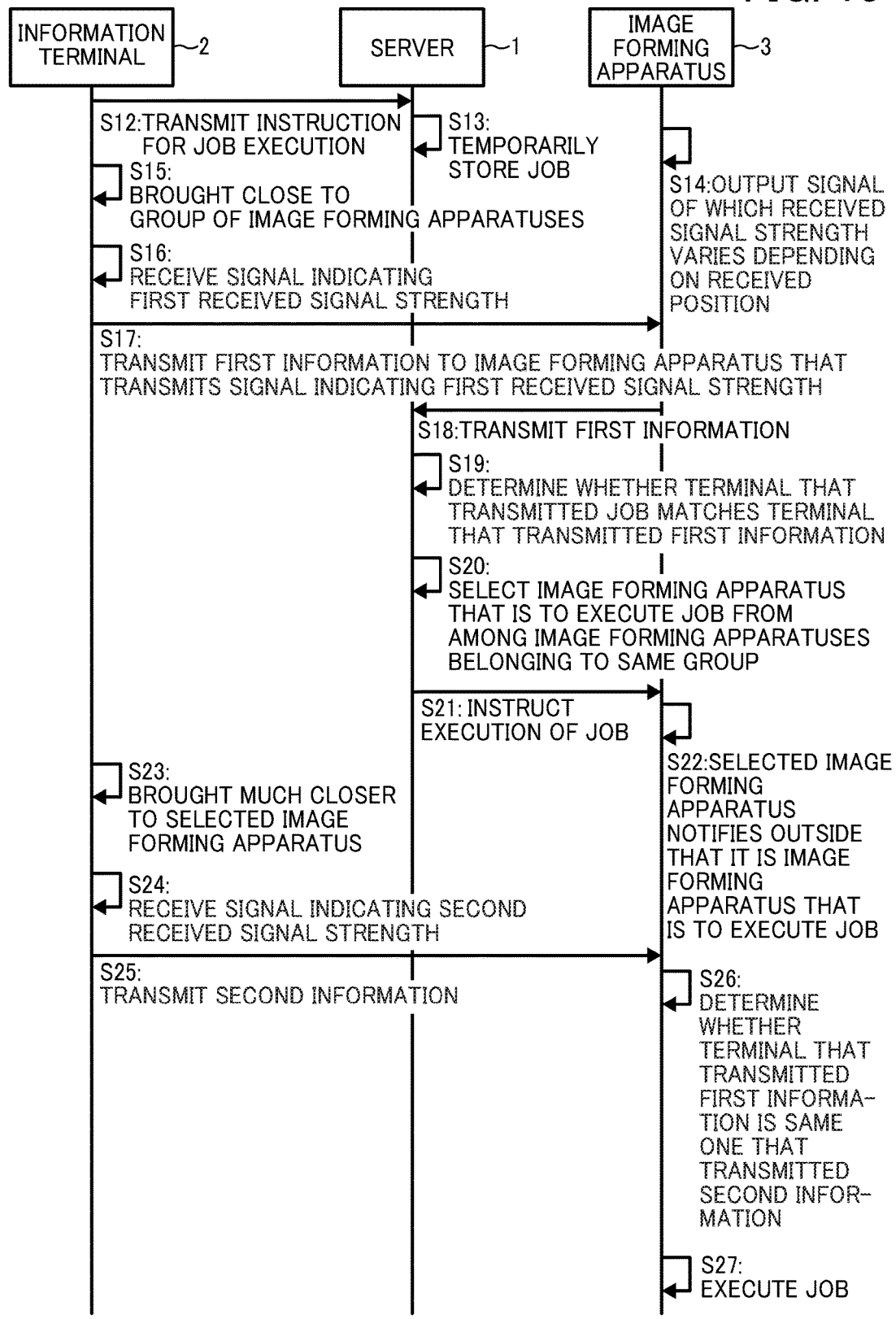
FIG. 13 is a sequence diagram illustrating in an operation performed by the image forming system according to an embodiment of the present invention.

Hereinafter, a description is given an operation performed by the image forming system 6 according to the present embodiment with reference to a sequence diagram. FIG. 13 is a sequence diagram illustrating an operation performed by the image forming system 6 according to the present embodiment.

First, the information terminal 2 transmits an instruction for executing a job including image output to the server apparatus 1 (S12). The server apparatus 1 temporarily stores the instruction for job execution together with the image data and other information necessary for the job execution (S13). Each image forming apparatus 4 of the image forming apparatus group 3 periodically generates and outputs a signal of which received signal strength varies depending on a position of the information terminal 2 that receives the signal (S14).

After transmitting the instruction for job execution to the server apparatus 1, the information terminal 2 is brought close to the image forming apparatus group 3 (S15). When the information terminal 2 is brought close to the image forming apparatus group 3, the information terminal 2 receives a signal indicating the first received signal strength (the received signal strength detected when the information terminal 2 is brought to the Area A in this embodiment) (S16). The information terminal 2 transmits the information indicating that the information terminal 2 is brought to the Area A and its own terminal ID to the image forming apparatus 4 from which the information terminal 2 receives the signal indicating the first received signal strength (S17).

The image forming apparatus 4 transfers, to the server apparatus 1, the information received from the information terminal 2, i.e., the information indicating that the information terminal 2 is brought to the Area A and its terminal ID (S18). The server apparatus 1 determines whether the information terminal 2 that has transmitted the instruction for job execution matches the information terminal 2 that has transmitted the information indicating that the information terminal 2 is brought to the Area A and its own terminal ID (S19).

When the server apparatus 1 determines that the information terminal 2 that has transmitted the instruction for job execution to the server apparatus 1 matches the information terminal 2 that has transmitted the information indicating that the information terminal 2 is brought to the Area A and its own terminal ID, the server apparatus 1 performs an operation of selecting the image forming apparatus 4 that is to execute the job from among the image forming apparatus group 3 belonging to the same group of the specific area (S20). After selecting the image forming apparatus 4 that is to execute the job, the server apparatus 1 instructs the selected image forming apparatus 4 to execute the job (S21). The selected image forming apparatus 4 notifies outside that the image forming apparatus 4 is an image forming apparatus that is to execute the job (S22).

Following the notification output from the image forming apparatus 4, the information terminal 2 is brought closer to the selected image forming apparatus 4 (S23). When the information terminal 2 is brought closer to the image forming apparatus 4, the information terminal 2 receives a signal indicating the second received signal strength (received signal strength detected when the information terminal 2 is brought to the Area B in the present embodiment) (S24). In response to receiving the signal indicating the second received signal strength, the information terminal 2 transmits the information indicating that the information terminal 2 is brought to the Area B and its own terminal ID to the image forming apparatus 4 (S25).

The image forming apparatus 4 determines whether the information terminal 2 that is brought to the Area A is the same one that is brought to the Area B (S26). When the image forming apparatus 4 determines that the information terminal 2 that is brought to the Area A is the same one that is brought to the Area B, the image forming apparatus 4 executes the job (S27).

An example embodiment has been described heretofore. Although the specific examples have been described, various modifications and improvements are possible within the scope of the appended claims.

In an example modified embodiment, as illustrated in FIGS. 14A and 14B, the information indicating a position of each image forming apparatus 4 may be omitted in the internal state database 23 of FIGS. 6A and 6B. When the internal state database 23 includes the position information of the image forming apparatus 4 as illustrated in FIGS. 6A and 6B, a setting may be configured such that the internal state of the image forming apparatus 4 that is closest to a current position of the information terminal 2 is checked prior to the other image forming apparatuses 4. Accordingly, the internal state database 23 as illustrated in FIGS. 6A and 6B clarifies a priority among the plurality of image forming apparatuses 4 depending on the position of the information terminal 2.

The image forming system 6 according to the described embodiments produces an effect especially when the plurality of the image forming apparatus 4 belonging to the same group are placed in one space such as a communal space on a floor. In other words, in a case in which a plurality of image forming apparatuses 4 are placed adjacent to one another or close to one another, the image forming apparatus 4 that is selected by the server apparatus 1 can attract (guide) a user who has instructed job execution toward the image forming apparatus 4 itself.

As described heretofore, according to the described embodiments, the image forming apparatus 4 is selected as an image forming apparatus that is to execute a user instruction for executing a job including image output based on the current internal state of the image forming apparatus 4. Accordingly, an environment for usage is implemented in which the possibility that the image forming apparatus 4 stops operating halfway through the job is reduced as less as possible.

As described heretofore, according to an embodiment of the present invention, a suitable image forming apparatus is selected, from among a plurality of image forming apparatuses, as an image forming apparatus that is to execute a user instruction for executing a job including image output based on the internal state of each of the image forming apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A server apparatus communicably connected to a plurality of image forming apparatuses, the server apparatus comprising:
    a memory having computer readable instructions stored thereon; and
    circuitry configured to execute the computer readable instructions to,
       store internal information of each of the plurality of image forming apparatuses in the memory, the plurality of image forming apparatuses categorized into one or more groups, each of the groups including at least two image forming apparatuses, the internal information including information related to at least one of a remaining number of sheets of paper and a remaining amount of toner,
       store a job in association with first identification information of a first information terminal in the memory, the job including image output that is received from the first information terminal,
       receive, from a first image forming apparatus from among the plurality of image forming apparatuses, second identification information of a second information terminal that is brought close to the first image forming apparatus,
       determine whether the first identification information matches the second identification information,
       based on a determination that the first identification information matches the second identification information, select an execution image forming apparatus for executing the job associated with the first identification information from among the plurality of image forming apparatuses that belong to a same group to which the first image forming apparatus belongs, the selecting including,
          determining, based on the internal information of the first image forming apparatus, whether the first image forming apparatus is available for execution of the job,
          based on a determination that the first image forming apparatus is available, determining whether there is a possibility that the first image forming apparatus stops operating before completion of the job based on the internal information, and
          based on a determination that there is no possibility that the first image forming apparatus stops operating before completion of the job, selecting the first image forming apparatus as the image forming apparatus that is instructed to execute the job, and
       instruct the selected image forming apparatus to execute the job.

2. The server apparatus of claim 1, wherein based on a determination that the first image forming apparatus is not available for execution of the job associated with the first identification information, the circuitry is further configured to:
    selects, from among the plurality of image forming apparatuses that belong to the same group to which the first image forming apparatus belongs as the image forming apparatus that is instructed to execute the job, a second image forming apparatus, the selecting including,
       determining whether the second image forming apparatus available for execution of the job and can complete execution of the job without stopping based on internal information of the second image forming apparatus.

3. The server apparatus of claim 1, wherein the circuitry is further configured to:
    determine whether there is an image forming apparatus among the plurality of image forming apparatuses of the same group as the first image forming apparatus; and
    when there is no image forming apparatus that can complete the job without stopping, a second image forming apparatus that has a low possibility of stopping operating before completing the job based on the internal information of the second image forming apparatus as the image forming apparatus that is instructed to execute the job.

4. The server apparatus of claim 1, wherein based on a determination that there is no image forming apparatus that is available for execution of the job from among the image forming apparatuses that belong to the same group as the first image forming apparatus, the circuitry is further configured to:
    transmit a notification to the first image forming apparatus that no image forming apparatus is available.

5. The server apparatus of claim 1, wherein the plurality of image forming apparatuses are categorized based on physical location.

6. The server apparatus of claim 1, wherein the internal information further includes a remaining amount of staples.

7. The server apparatus of claim 1, wherein the circuitry is further configured to:

periodically receive the internal information from each of the plurality of image forming apparatuses; and
store the received internal information in the memory.

8. The server apparatus of claim 1, wherein the circuitry is further configured to:
transmit a notification to the selected image forming apparatus indicating that the selected image forming apparatus is to execute the job, wherein
the transmitted notification causes the selected image forming apparatus to emit light notifying a user of the second information terminal that the selected image forming apparatus is executing the job associated with the first identification information.

9. The server apparatus of claim 1, wherein the circuitry is further configured to:
transmit a notification to the selected image forming apparatus indicating that the selected image forming apparatus is to execute the job, wherein
the transmitted notification causes the selected image forming apparatus to emit a sound notifying a user of the second information terminal that the selected image forming apparatus is executing the job associated with the first identification information.

10. An image forming system comprising:
a server apparatus configured to receive a job including image output from a first information terminal; and
a plurality of image forming apparatuses, the plurality of image forming apparatuses being communicably connected to each other and the server apparatus, wherein,
the server apparatus includes,
a memory having stored thereon computer readable instructions, and
first circuitry configured to execute the computer readable instructions to,
store internal information of each of the plurality of image forming apparatuses in the memory, the plurality of image forming apparatuses categorized into one or more groups, each of the groups including at least two image forming apparatuses, the internal information including information related to at least one of a remaining number of sheets of paper and a remaining amount of toner,
store the job in association with first identification information of the first information terminal in the memory,
receive, from a first image forming apparatus from among the plurality of image forming apparatuses, second identification information of a second information terminal that is brought close to the first image forming apparatus,
determine whether the first identification information of matches the second identification information,
based on a determination that the first identification information matches the second identification information, select an execution image forming apparatus that for executing the job stored in the memory in association with the first identification information from among the plurality of image forming apparatuses that belong to a same group as the first image forming apparatus, the selecting including,
determining, based on the internal information of the first image forming apparatus, whether the first image forming apparatus is available for execution of the job,
based on a determination that the first image forming apparatus is available, determining whether there is a possibility that the first image forming apparatus stops operating before completion of the job based on the internal information, and
based on a determination that there is no possibility that the first image forming apparatus stops operating before completion of the job, selecting the first image forming apparatus as the image forming apparatus that is instructed to execute the job, and
instruct the selected image forming apparatus to execute the job,
each of the plurality of image forming apparatus includes, second circuitry configured to,
in response to receiving an instruction to execute the job from the server apparatus, output a notification indicating that the image forming apparatus is to execute the job,
receive third identification information of a third information terminal from the third information terminal that is brought close to the image forming apparatus,
determine whether the second identification information matches the third identification information, and
in response to a determination that the second identification information matches the third identification information, execute the job in accordance with the instruction received from the server apparatus.

11. The image forming system of claim 10, wherein each of the plurality of image forming apparatuses further comprise:
a signal transmitter configured to transmit a signal of which a received signal strength varies depending on a distance between the image forming apparatus and an information terminal that receives the signal, wherein
the information terminal uses the signal for determining whether the information terminal is brought close to the image forming apparatus.

12. A non-transitory computer-readable storage medium storing a computer-executable program which, when executed, causes a server apparatus to perform a method, wherein the server apparatus communicably connected to a plurality of image forming apparatuses and at least one information terminal, the method comprising:
storing internal information of each of the plurality of image forming apparatuses in a memory, the plurality of image forming apparatuses categorized into one or more groups, each of the groups including at least two image forming apparatuses, and the internal information including information related to at least one of a remaining number of sheets of paper and a remaining amount of toner;
storing a job received from a first information terminal in association with first identification information of the first information terminal in the memory, the job including image output that is received from the first information terminal;
receiving, from a first image forming apparatus from among the plurality of image forming apparatuses, second identification information of a second information terminal that is brought close to the first image forming apparatus;
determining whether the first identification information matches the second identification information;
based on a determination that the first identification information matches the second identification information, selecting an execution image forming apparatus that is to execute the stored job from among the plurality of image forming apparatuses that belong to a same group to which the first image forming apparatus belongs, and the selecting including,
- determining, based on the internal information of the first image forming apparatus, whether the first image forming apparatus is available for execution of the job,
- based on a determination that the first image forming apparatus is available, determining whether there is a possibility that the first image forming apparatus stops operating before completion of the job based on the internal information, and
- based on a determination that there is no possibility that the first image forming apparatus stops operating before completion of the job, selecting the first image forming apparatus as the image forming apparatus that is instructed to execute the job; and instructing the selected image forming apparatus to execute the job.

\* \* \* \* \*